United States Patent [19]

Inaba et al.

[11] 4,117,081

[45] Sep. 26, 1978

[54] METHOD OF AND CATALYSTS FOR REMOVAL OF NITROGEN OXIDES

[75] Inventors: Hideya Inaba; Shigenori Onizuka; Yasumi Kamino, all of Osaka, Japan

[73] Assignee: Hitachi Shipbuilding & Engineering Co., Ltd., Osaka, Japan

[21] Appl. No.: 836,131

[22] Filed: Sep. 23, 1977

Related U.S. Application Data

[63] Continuation of Ser. No. 667,674, Mar. 17, 1976, abandoned, which is a continuation-in-part of Ser. No. 471,182, May 20, 1974, abandoned.

[30] Foreign Application Priority Data

May 28, 1973 [JP] Japan .................................. 48-59479

[51] Int. Cl.$^2$ ............................................. B01D 53/34
[52] U.S. Cl. .................................. 423/239; 252/466 B
[58] Field of Search .................. 423/212, 213.5, 213.7, 423/239; 252/466 B, 466 J

[56] References Cited

U.S. PATENT DOCUMENTS

| | | | |
|---|---|---|---|
| 3,429,656 | 2/1969 | Taylor et al. | 423/239 X |
| 3,816,594 | 6/1974 | Kobylinski et al. | 423/213.7 |
| 3,835,069 | 9/1974 | Gandhi et al. | 423/212 X |
| 3,840,839 | 10/1974 | Kobylinski et al. | 423/213.5 |
| 3,907,968 | 9/1975 | Kobylinski et al. | 423/213.5 |
| 4,002,723 | 1/1977 | Inoba et al. | 423/239 A |

*Primary Examiner*—G. O. Peters
*Attorney, Agent, or Firm*—Joseph W. Farley

[57] ABSTRACT

Nitrogen oxides are removable from an exhaust gas containing a reductant such as carbon monoxide, hydrogen and methane by contacting the gas with a catalyst composed of alumina, copper, rhodium or ruthenium, and at least one of the alkali metals, the alkaline earth metals and the transition metals; for example, a catalyst composed of 0.051%Rh—5%Cu—3%Mg—Al$_2$O$_3$. The activity of such catalysts is not influenced by the presence of O$_2$, H$_2$O and SO$_2$ in the exhaust gas.

4 Claims, 9 Drawing Figures

FIG.1

The number of times of the injection of $SO_2$

Catalyst: 5%Cu-3%Mg-$Al_2O_3$

Reaction gas composition: 500ppmNO+0.4%$O_2$+1.1%$H_2$ +15%$CO_2$+13%$H_2O$+$N_2$ Reaction temperature: 450° C Space velocity: $10^4 hr^{-1}$ (converted for 20°C)

FIG.2 the number of times of the injection of $SO_2$

Reaction gas composition: 600ppmNO+0.4%$O_2$
+1%CO+13%$CO_2$+10%$H_2O$+$N_2$

Reaction temperature: 450°C

Space velocity: $10^4 hr^{-1}$ (converted for 20°C)

FIG.3

Experiment of $H_2 + NO + SO_2 + O_2 + CO_2 + H_2O + N_2$ reaction gas system

FIG.4

Experiment of $CH_4 + NO + SO_2 + O_2 + CO_2 + H_2O + N_2$ reaction gas system

FIG. 5

Experiment using CO + NO + SO$_2$ + O$_2$ + CO$_2$ + H$_2$O +N$_2$ reaction gas system

FIG. 6

Experiment using CO + NO + SO$_2$ + O$_2$ + CO$_2$ + H$_2$O + N$_2$ reaction gas system

FIG.7

Experiment using $CO + NO + SO_2 + O_2 + CO_2 + H_2O + N_2$

FIG.8

Catalyst: $0.005\%Rh-Cu-Mg-Al_2O_3$ $H_2 + NO + SO_2 + O_2 + CO_2 + H_2O + N_2$ reaction gas system

FIG.9

Experiment using $H_2$ + NO + $SO_2$ + $O_2$ + $CO_2$ + $H_2O$ + $N_2$ reaction gas system

METHOD OF AND CATALYSTS FOR REMOVAL OF NITROGEN OXIDES

This is a continuation of application Ser. No. 667,674, filed May 17, 1976, said application being a continuation of application Ser. No. 471,182, filed May 20, 1974, and both now abandoned.

Nitrogen oxides discharged from various burners, chemical plants, and cars have offered a serious social problem as they form air pollutants. Therefore, it is strongly desired to take some decisive countermeasure for removal thereof, and researches therefor are being conducted in various places, as is well-known.

Basically, countermeasures for removal of $NO_x$ may be divided into two methods, one for supressing the production of $NO_x$ and the other for making $NO_x$ harmless after it is produced. As for the former method, a two-step combustion process, a low-oxygen combustion process and an exhaust gas circulation process are being studied. The latter method includes a process for conversion into nitrogen through a catalytic reaction and a second process for absorption removal by using an absorptive liquid. These processes, however, have their own merits and demerits. There has been established to process that is industrially satisfactory.

While seven different forms of nitrogen oxides are known, those which have relation to air pollution are NO and $NO_2$, and these two forms are collectively termed $NO_x$. It is said that the $NO_x$ in an ordinary exhaust gas contains 90~95% or more NO, the balance being $NO_2$. Therefore, a countermeasure for the removal of $NO_x$ would do if only it is capable of removing at least NO.

In view of such situation, we have conducted researches on a countermeasure for removal of $NO_x$ and have obtained satisfactory results.

One method of removal of $NO_x$, as is known for U.S. Patent No. 3,454,355 and other literature (examples: W. Bartok, et al., "System Study of Nitrogen Oxide Control Methods for Stationary Sources" Final Report — Vol. II, Esso Research and Engineering Company Government Research Laboratory, November 20, 1969), comprises using a material as a catalyst consisting of alumina serving as a carrier and carrying copper, platinum or other metal thereon and allowing $NO_x$ to react with carbon monoxide, hydrogen or methane to reduce $NO_x$ into nitrogen thereby making it harmless. Such methods produce no by-products. However, as a result of our follow-up tests of these methods, it has become clear that with these catalysts and in the case of actual exhaust gases, effective reduction-wise removal of $NO_x$ cannot be attained. That is, in our experiments, it has been found that the catalyst is poisoned by oxygen, moisture or sulfur oxides contained in exhaust gases.

Our results are shown in the experimental examples hereinafter described and in the accompanying drawings, in which.

EXPERIMENT EXAMPLE 1

In this experiment, a typical catalyst found in conventional literature, that is, a material comprising copper carried on γ-alumina was used. Such catalyst is prepared by immersing commercially available γ-alumina sieved to 8~14 meshes in an aqueous solution of copper nitrate for a fixed period of time, separating the aqueous solution, carrying out drying at 100°~120° C and baking at 540° C. In addition, the amount of Cu carried in this catalyst was 5 wt%.

The reaction pipe was a quartz pipe with an inner diameter of 30mm and installed within an annular furnace, it being so arranged that the reaction temperature could be preset at a predetermined temperature. The reduction of $NO_2$ (in the experiment, NO being used) by CO and $H_2$ was carried out by filling the reaction pipe with said catalyst, followed by treatment with nitrogen gas at 540° for 1 hour. The reaction gas was prepared by mixing bottled mixed gases $CO + N_2$, $H_2 + N_2$, $O_2 + N_2$, $NO + N_2$ and $SO_2 + N_2$ of predetermined controlled concentrations in accordance with the experimental conditions and was then admitted into the reaction pipe.

In addition, moisture was added by detonating the $O_2 + N_2$ mixed gas in the water in a bubbler installed in a thermostatic water tank controlled to a predetermined temperature before the flows of said various mixed gases meet each other.

The rate of reduction-wise removal of NO was determined by gas analyzers at the inlet and outlet ports of the reaction pipe, but an $NO_2$ meter produced by Masr Company was used for the analysis of NO. The NO in the sample gas was oxidized into $NO_2$ by an oxidizing device and then admitted into the analyzer. $SO_2$, CO and $O_2$ were continuously analyzed by using an infrared type analyzer (produced by Horiba Seisaku-Sho), an infrared type analyzer (produced by Fuji Denk Seizo) and a magnetic type analyzer (produced by Simazu Seisaki-Sho), respectively. Further, $H_2$ was analyzed by a gas chromatograph (produced by Simazu Seisaku-Sho). In addition, the moisture concentration was determined by calculation.

The conditions and results of the experiment are shown in Tables 1-1 and 1-2.

Table 1-1

| Reaction gas composition (the balance being $N_2$) (Dry gas basis) | | | | | Reaction temperature (° C) | Space velocity (at 20° C) (hr$^{-1}$) | Rates of reaction of NO and $SO_2$ (%) | |
|---|---|---|---|---|---|---|---|---|
| NO | $O_2$ | $SO_2$ | CO | $H_2O$ | | | NO | $SO_2$ |
| ppm | % | | % | % | | | | |
| 300 | 0 | 2500 ppm | 0.75 | 0 | 540 | 10$^4$ | 98 | 100 |
| 300 | 1.0 | 1500 | 2.75 | 10 | 540 | 10$^4$ | 0 | 0 |
| 280 | 0 | 0 | 2.57 | 0 | 540 | 10$^4$ | 100 | — |
| 280 | 1.1 | 0 | 2.57 | 10 | 540 | 10$^4$ | 0 | — |

*Note: $H_2O$ concentration is indicated on a wet gas basis.

Table 1-2

| Reaction gas composition (the balance being $N_2$) (Dry gas basis) | | | | Reaction temperature 6° C | Space velocity (at 20° C) (hr$^{-1}$) | Rate of reaction of NO and $SO_2$ (%) | |
|---|---|---|---|---|---|---|---|
| NO | $O_2$ | $SO_2$ | $H_2$ | | | NO | $SO_2$ |
| ppm | % | ppms | % | % | | | |
| 500 | 0 | 1000 | 1.0 | 0 | 450 | 10$^4$ | 100 | 100 |

Table 1-2-continued

| Reaction gas composition (the balance being $N_2$) (Dry gas basis) | | | | Reaction temperature 6° C | Space velocity (at 20° C) ($hr^{-1}$) | Rate of reaction of NO and $SO_2$ (%) | |
|---|---|---|---|---|---|---|---|
| NO | $O_2$ | $SO_2$ | $H_2$ | | | NO | $SO_2$ |
| 500 | 0.4 | 1000 | 1.2 | 10 | 450 | $10^4$ | 0 | 0 |
| 500 | 0 | 0 | 1.0 | 0 | 450 | $10^4$ | 100 | — |
| 500 | 0.4 | 0 | 1.2 | 10 | 450 | $10^4$ | 0 | — |

*Note: $H_2O$ concentration is indicated on a wet gas basis.

Table 1-1 corresponds to the case where CO is used as a reducing agent, while Table 1-2 indicates that results when $H_2$ is used as a reducing agent. In each case, when there is neither $O_2$ nor $H_2O$ in the reaction gas, substantially complete reduction-wise removal of NO and $SO_2$ is achieved, However, with $O_2$ with $H_2O$ admitted into the reaction gas, this catalyst loses its activity. This may also be said of the case of the single reduction of NO.

Apart from $SO_2$, actual exhaust gases from boilers, chemical plants and cars contain $O_2$ and $H_2O$ without exception. Further, it is almost impossible to remove these gases, particularly $H_2O$. Therefore, it may be concluded that this catalyst cannot be used in actual exhaust gases. In addition, further tests were also carried out using this catalyst with the reducing agent replaced by a hydrocarbon such as $CH_4$, but similarly the catalyst lost its activity under the influence of $O_2$ and $H_2O$.

We have conducted earnest researches for a catalyst which is immune from the influence of $O_2$ and $H_2O$ and we have obtained very good results. That is, we have successfully removed the influence of $O_2$ and $H_2O$ contained in reaction gases by adding one or more of the elements selected from the group consisting of the alkali metals such as potassium, the alkaline earth metals such as barium and magnesium and the transition metals such as chromium, manganese and iron to an alumina catalyst carrying copper thereon. The results are shown in Experiment Example 2.

EXPERIMENT EXAMPLE 2

The equipment used in Experiment Example 1 was used in this experiment, and the experimental method was also approximately the same. In this experiment, however, $CO_2$ was also added to a reaction gas in order to make the latter resemble the actual exhaust gas more closely. In addition, a gas chromatograph was useful in the analysis of $CO_2$ and $CH_4$. In this case, an example is shown in which CO, $H_2$ and $CH_4$ are used as reducing agents, but there was observed some difference in the reaction temperature at which the effective reduction of NO was achieved. That is, in the case of CO and $H_2$, temperatures of about 300° C or above were required, whereas temperatures of 590° C or above were required in the case of $CH_4$. Thus, the reduction experiments were conducted at 450° C for CO and $H_2$ and at 600° C for $CH_4$. Further, the prepared catalyst was used in its state established when it had been baked at 540° C. As in the previous experiment, $H_2$ reduction treatment was carried out, but there was no substantial difference in the result, except that an activation period of about 1 hour at maximum was taken before a fixed high activity was obtained. The conditions of the experiments are as follows.

(1) CO reduction experiment conditions
Reaction gas composition;
500ppm NO + 0.4%$O_2$ + 1%CO + 13%$CO_2$ + 13%$H_2O$ + $N_2$
Reaction temperature; 450° C
Space velocity (converted for 20° C); $10^4 hr^{-1}$
(2) $H_2$ reduction experiment conditions
Reaction gas composition;
500ppm NO + 0.4%$O_2$ + 1.1%$H_2$ + 15%$CO_2$ + 10%$H_2O$ + $N_2$
Reaction temperature; 450° C
Space velocity (converted for 20° C); $10^4 hr^{-1}$
(3) $CH_4$ reduction experiment conditions
Reaction gas composition;
500ppm NO + 4%$O_2$ + 2.3%$CH_4$ + 13%$CO_2$ + 10%$H_2O$ + $N_2$
Reaction temperature; 600° C
Space velocity (converted for 20° C); $10^4 hr^{-1}$ The experimental results are shown in Table 2. In addition, the percentage value preceding each metal element indicates the analyzed value.

Table 2

| CATALYSTS | Rate of reduction-wise removal of NO (%) | | |
|---|---|---|---|
| | CO | $H_2$ | $CH_4$ |
| 5.3% Ce - 4.4% Mg—$Al_2O_3$ | 100 | 100 | 95 |
| 5.0% Cu - 5.0% Ba—$Al_2O_3$ | 100 | 100 | 100 |
| 5.0% Cu - 0.2% K—$Al_2O_3$ | 90 | 89 | 80 |
| 5.1% Cu - 5.4% Cr—$Al_2O_3$ | 100 | 100 | 85 |
| 8.1% Cu - 5.1% Mn—$Al_2O_3$ | 100 | 100 | 90 |
| 5.8% Cu - 6.8%Fe—$Al_2O_3$ | 99 | 11 99 | 100 |
| 5.6% Cu - 6.8% Mo—$Al_2O_3$ | 89 | 85 | 85 |
| 5.1% Cu - 0.2% Pr—$Al_2O_3$ | 40 | 40 | 10 |

As shown in Table 2, these are decidedly superior catalysts. However, when 500~1000ppm $SO_2$ was added to said reaction gas, all of these catalysts were gradually poisoned by $SO_2$, so that the NO reduction activity was decreased. When the concentration of the individual reducing agent was extremely increased, however, the rate of reduction of NO was achieved to some extent (30~80%), but $SO_2$ was reduced substantially completely into $H_2S$ and COS. Therefore, when it is desired to use these catalysts, except for the special case of the exhaust gas not containing $SO_2$, it is necessary to remove $SO_2$ in advance in order to prevent the production of $H_2S$ and COS.

An ideal $NO_x$ reduction catalyst would have to be such that it is immune from the influence of $SO_2$ contained in reaction gases and that it has a suitable activity not causing the conversion of $SO_2$ itself into $H_2S$ or COS.

The degree to which the various catalysts described above are influenced by $SO_2$ differs with the kind of additive metals, that is, metals other than Cu, and also with the concentration. Of these catalysts, those which are relatively immune from the influence of $SO_2$ were Cu—Mg—$Al_2O_3$, Cu—Mn—$Al_2O_3$, etc. Further, in the case of the Cu—Mg—$Al_2O_3$ catalyst, relatively good results were obtained when the Mg concentration was about 3%. Thus, the results of a check on the $SO_2$ poisoned conditions of the 5%Cu—3%Mg—$Al_2O_3$ catalyst are shown in Experiment Example 3.

EXPERIMENT EXAMPLE 3

Figure 1:
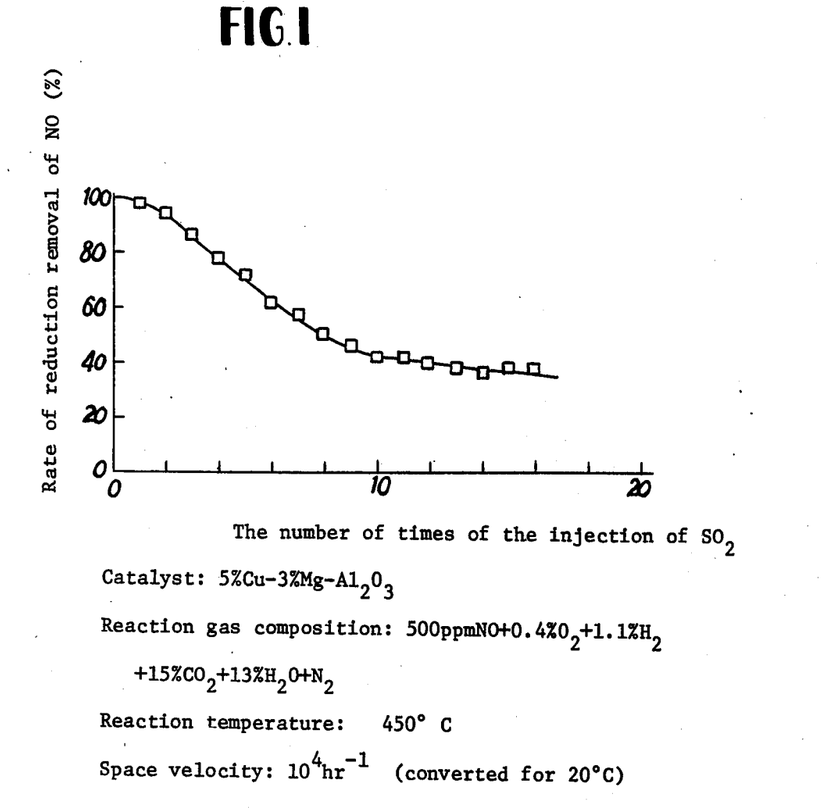
FIG. 1 is a graph illustrating the results of our Experiment Example 3.

The experimental equipment and method were the same as those described in Experiment Example 2. In order to observe the influence of $SO_2$, pure $SO_2$ collected in advance was intermittently injected at a fixed rate by a syringe into the reaction gas immediately before the reaction pipe. In addition, the rate of injec- tion was adjusted so that the SO₂ concentration in the reaction gas was about 1000ppm. The results of the experiment are shown in FIG. 1, in which the number of times of the injection of SO₂ is plotted on the horizontal axis and the rate of reduction of NO on the vertical axis. While FIG. 1 shows the results when H₂ is used as a reducing agent, there was observed almost no difference in the degree of poisoning by SO₂ when CO or CH₄ was used. That is, it has been ascertained that the SO₂ poisoning has relation to SO₂ and catalysts but has nothing to do with the kind of reducing gases.

On the other hand, as is generally known a catalyst carrying thereon a precious metal such as platinum, ruthenium, rhodium and palladium is effective for use as a reduction catalyst and utilized in various contact reactions. Thus, we have made a check on the NO reducing characteristics of such catalysts. The results are shown in Experiment Example 4.

EXPERIMENT EXAMPLE 4

The experimental equipment and method were the same as those previously described, but in this experiment, O₂ was not contained in the reaction gas. The reaction gas composition is as follows and the experimental results are shown in Table 3.

Reaction gas composition;

300ppm NO + 1700ppm SO₂ + 0.6%CO + 10%H₂O + N₂

Reaction temperature; 540° C
Space velocity (converted for 20° C); 5000 hr⁻¹

Table 3

| CATALYST | Rate of reaction (%) | |
|---|---|---|
| | NO | SO₂ |
| 2.5% Ru—Al₂O₃ | 40 | 88 |
| 0.5% Rh—Al₂O₃ | 17 | 83 |
| 0.5% Pd—Al₂O₃ | 10 | 84 |
| 0.5% Pt—Al₂O₃ | 16 | 73 |

The rate of removal of NO, though low, is retained. Further, the rate of reaction of SO₂ is about 70~90%, but the amount of H₂S detected on the outlet side was 1410ppm for Ru—Al₂O₃, 1420ppm for Rh—Al₂O₃, 1400ppm for Pd—Al₂O₃, and 1200ppm for Pt—Al₂O₃. Further, slight amounts of COS were detected. Similarly, when H₂ was used as a reducing agent, SO₂ was converted into H₂S. NOₓ-reduction experiments were conducted under a condition in which SO₂ had been removed from the reaction gas. However, in the case of CO reduction and H₂ reduction, NH₃ was formed in the reaction gas and the making harmless of NOₓ could not be achieved. In CO reduction, it is believed that the reason for the production of NH₃ is that the reaction between CO and H₂O produces H₂, which reacts with NO to produce NH₃. As described above, if a catalyst prepared by carrying a precious metal alone on a γ-alumina carrier is used, conversion of SO₂ or conversion of NO into NH₃ takes place and under co-existence with SO₂ it has not sufficient NO-reduction activity. Thus, it may be concluded that it is not an industrially satisfactory catalyst.

However, we have successfully developed an extremely unique superior catalyst by adding a slight amount of precious metal to the previously described Cu—Me—Al₂O₃ type catalyst (wherein Me designates one or more metals selected from the group consisting of the alkaline earth metals, alkali metals and transition metals). The results of the present invention will now be described with reference to Experiment Examples.

EXPERIMENT EXAMPLE 5

In this experiment, an example will be described in which 5%Cu—3%Mg—Al₂O₃ was used as the base of a catalyst. Thus, catalysts prepared by immersing 5%Cu—3%Mg—Al₂O₃ (8~14 meshes, crushed product) in aqueous solutions of salts of Ru, Rh, Pd and Pt, respectively, were used. The Ru, Rh, Pd and Pt contents were as follows.

0.051%Ru — Cu — Mg — Al₂O₃
0.051%Rh — Cu — Mg — Al₂O₃
0.053%Pd — Cu — Mg — Al₂O₃
0.052%Pt — Cu — Mg — Al₂O₃

Figure 2:
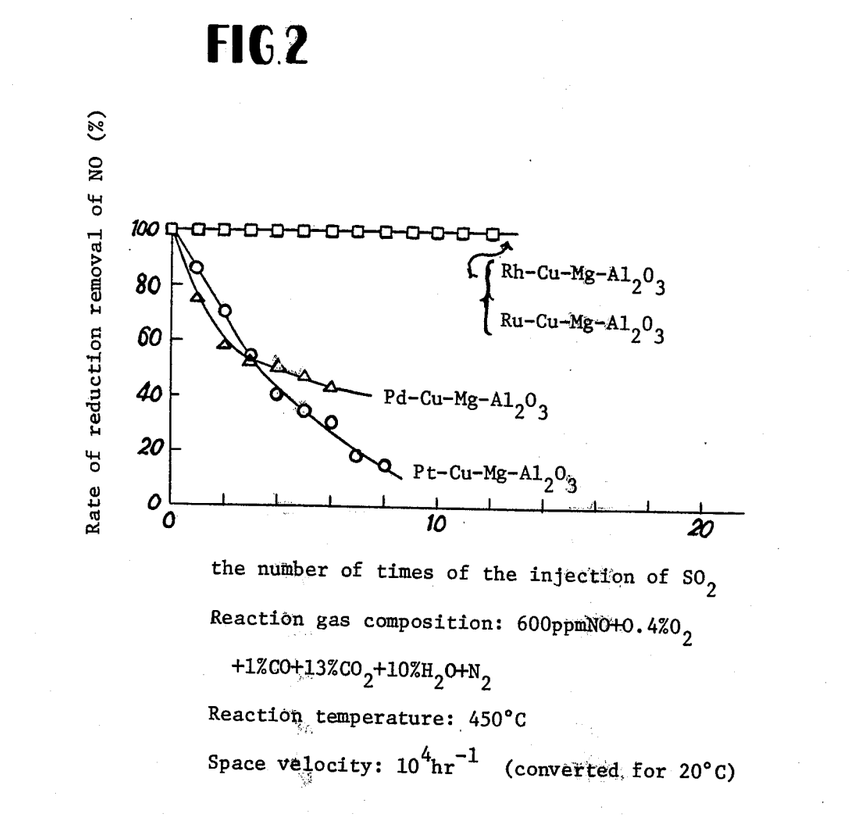
FIG. 2 is a graph illustrating the results of our Experiment Example 5.

The experimental equipment and method were substantially the same as in the preceding experiment examples, and the influence of SO₂ was determined by intermittently injecting the same. CO was used as a reducing agent. The conditions are shown below and the experimental results are shown in FIG. 2. As seen in FIG. 2, even if SO₂ was injected, Rh — Cu — Mg — Al₂O₃ and Ru — Cu — Mg — Al₂O₃ did not exhibit any change in their NO reducing capacities, and NO was completely removed. In contrast, Pt — Cu — Mg — Al₂O₃ and Pd — Cu — Mg — Al₂O₃ were strongly influenced by SO₂. Indeed, they were even more adversely influenced than was the Cu — Mg — Al₂O₃ not carrying such precious metal. The fact that very good results are obtained when Rh and Ru are added and that the results are not good in the case of Pt and Pd, is contrary to our expectations and shows that mere addition of the precious metals in slight amounts is not effective to avoid the poisoning by SO₂.

The behavior of SO₂ will be described in the following experiment examples 7 and 8.

Next, an example in which the rate of reduction-removal of NO at different temperatures while a reaction gas is continuously flowing, by using H₂, CH₄ and CO reducing agents, is shown in Experiment Examples 6 and 7.

EXPERIMENT EXAMPLE 6

In this experiment example, the case of the 0.051%Rh—Cu—Mg—Al₂O₃ is shown, but the conditions for reaction are as follows.

i. H₂ reduction experiment
Reaction gas composition;

500ppm NO + 600ppm SO₂ + 1.1%H₂ + 0.4%O₂ + 15%CO₂ + 10%H₂O + the balance N₂
Space velocity (converted for 20° C); 10⁴hr⁻¹ ii. CH₄ reduction experiment
Reaction gas composition;

500ppm NO + 600ppm SO₂ + 2.5%CH₄ + 4%O₂ + 13%CO₂ + 10%H₂O + the balance N₂
Space velocity; 10⁴hr⁻¹

Figure 3:
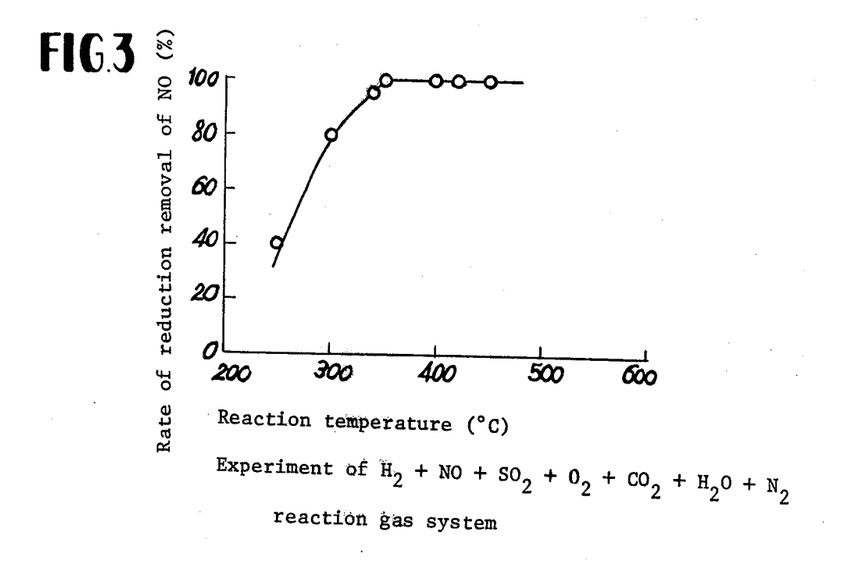
FIGS. 3 and 4 are graphs illustrating the results of our Experiment Example 6.
Figure 4:
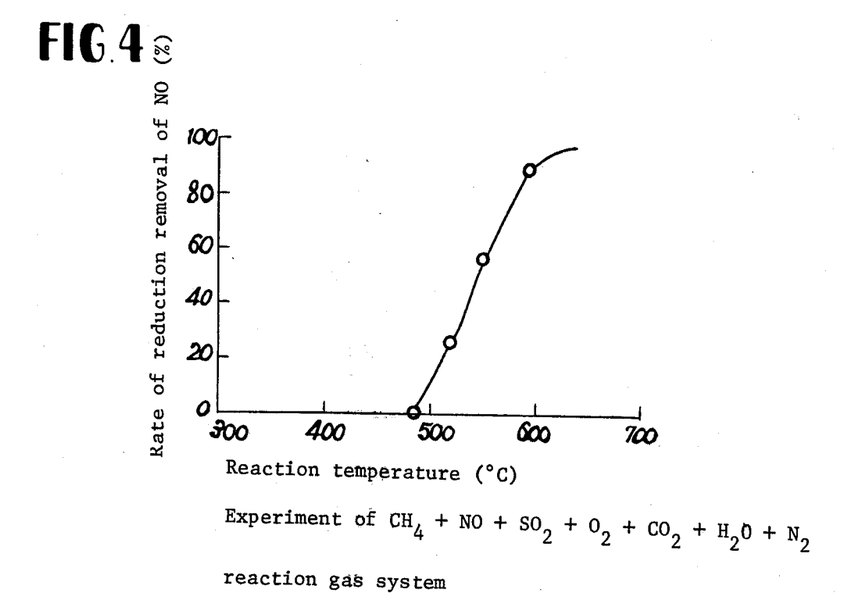

Graphs corresponding to the above conditions are shown in FIGS. 3 and 4. As seen in these Figures, even under the presence of SO₂, this catalyst was not influenced by SO₂ at all, and extremely effective removal of NOₓ was possible provided that the temperature was above 300° C for reduction with H₂ and above 600° C for reduction with CH₄. These reaction temperatures are as superior as the results obtained with the Cu—Mg—Al₂O₃ catalyst, using a gas not containing SO₂.

These experiments were continuously conducted, each expending about 50 hours, during which the catalysts themselves displayed no sign of deterioration. Further, $SO_2$ on the outlet side was analyzed, and there was observed a decrease due to absorption by the catalyst itself in the initial stage of the experiment, but about 2 hours after the start of passage of the gas, it coincided with the inlet concentration. There was observed almost no conversion into $H_2S$. Further, there was observed no $NH_3$ caused by excessive reduction of NO. These properties fully satisfy the previously described requirements for an industrial catalyst.

EXPERIMENT EXAMPLE 7

The catalyst used in this experiment example was 0.051% Rh—Cu—Mg—$Al_2O_3$, which was the same as that used in the preceding experiment example. Further, CO was used as a reductant. The conditions for reaction are as follows.

Figure 5:
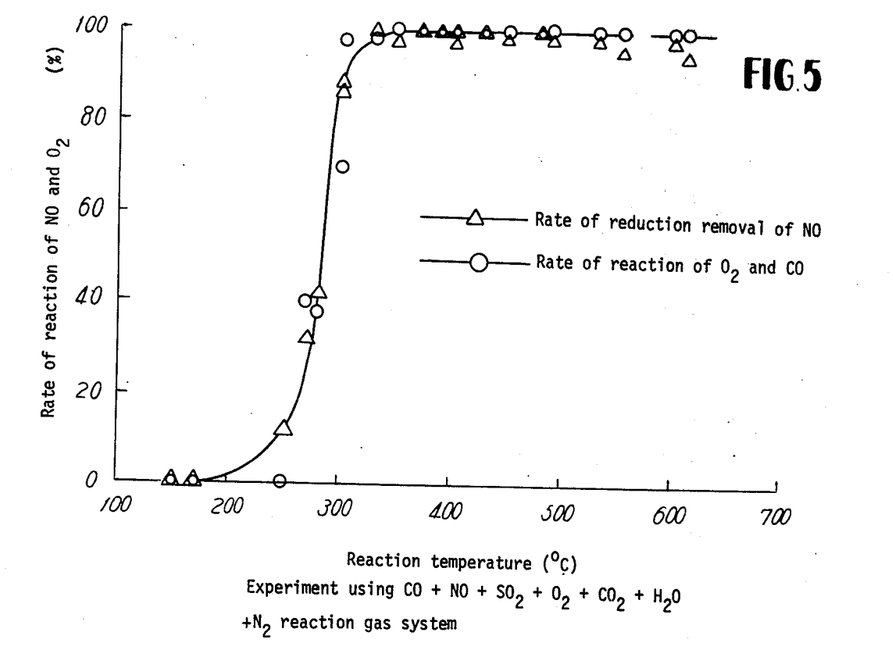
FIGS. 5 and 6 are graphs illustrating the results of our Experiment Example 7.
Figure 6:
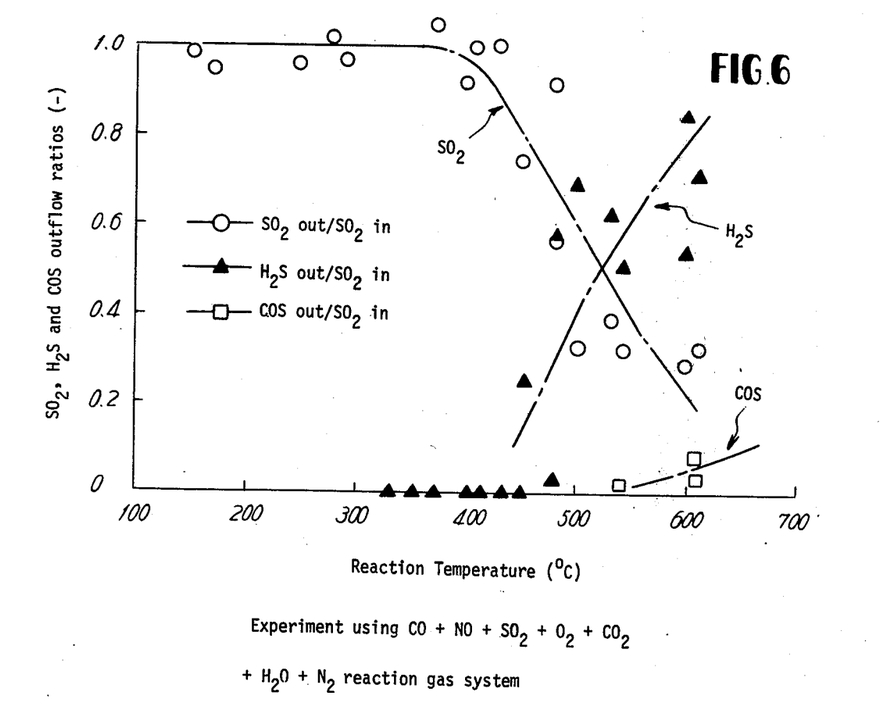

Reaction gas composition;
600ppm NO + 600ppm $SO_2$ + 1% CO + 0.4% $O_2$ + 13% $CO_2$ + 10% $H_2O$ + the balance $N_2$
Space velocity (converted for 20° C); $10^4 hr^{-1}$ The results obtained under the above conditions are shown in FIGS. 5 and 6. FIG. 5 shows the reaction temperature and the rate of reduction removal of NO. It also shows the rate of reaction of $O_2$ and CO. FIG. 6 shows the behavior of $SO_2$ during the experiment, or the ratio of the $SO_2$ concentration in a reaction pipe inlet gas to the sulfide concentration in the gas on the outlet side.

As seen in FIG. 5, even if CO is used as a reductant, very efficient removal of $NO_x$ is possible only if the temperature is at least 300° C. Further, what should be noted is the relation between the rate of reaction of $O_2$ and CO and the rate of reduction of $NO_x$. Thus, as seen in the Figure, these two rates are almost the same. This is a feature of the present catalyst as compared with the conventional catalyst with which, when reductants such as CO, $H_2$ and $CH_4$ are used, the rate of reaction of $O_2$ and such reductants is higher than the rate of reduction of $NO_x$. The same was also ascertained in the case of using said $H_2$ and $CH_4$ as reductants, but reference thereto has been omitted herein.

Referring to FIG. 6, although the data show some scatter, the behavior of $SO_2$ can be fully observed. At temperatures below 450° C, the $SO_2$ on the reaction pipe inlet side undergoes no change whatever, passing through the catalyst layer. It is at temperatures from about 500° C upwards that $H_2S$ is evolved, whereas COS is evolved in the range of above 600° C. Therefore, all the $SO_2$ is not changed into $H_2S$ or COS, but temperatures above 300° C suffice for complete reduction removal of $NO_x$. Therefore, by using temperatures of about 300~450° C as the reaction temperature, the evolution of $H_2S$ or COS does not become a problem at all. In this experiment example, there was no production of $NH_3$ recognized as in the experiment example 6 using $H_2$ and $CH_4$.

EXPERIMENT EXAMPLE 8

In the preceding experiment example 7, the behavior of $SO_2$ described therein refers to the results after the equilibrium state is established. In this experiment example, the behavior of $SO_2$ in the initial stage when a reaction gas containing $SO_2$ is started to flow through a virgin catalyst will be described. The conditions for experiment are as follows.

Figure 7:
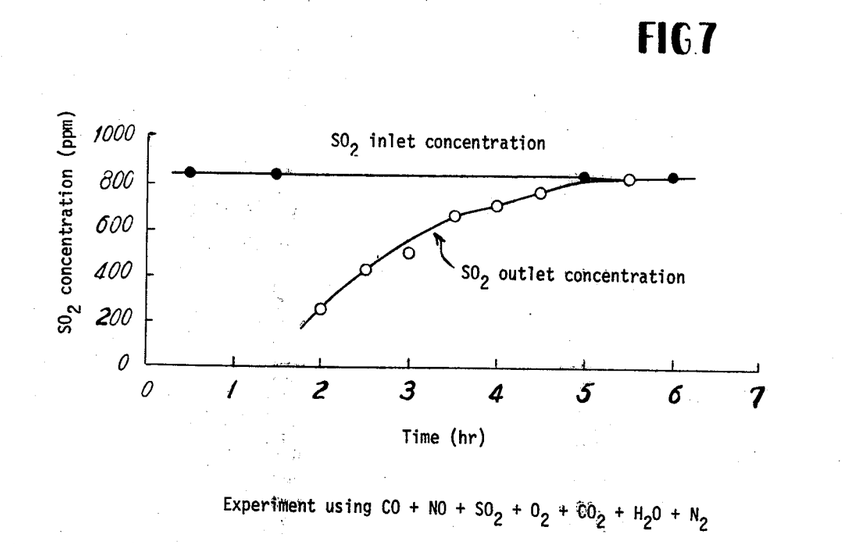
FIG. 7 is a graph illustrating the results of our Experiment Example 8.

Catalyst; 0.051% Rh—Cu—Mg—$Al_2O_3$
Exhaust gas composition; 400ppm NO + 830ppm $SO_2$ + 1% CO + 0.4% $O_2$ + 14% $CO_2$ + 10% $H_2O$ + the balance $N_2$
Space velocity (converted for 20° C); $10^4 hr^{-1}$
Reaction temperature; 450° C The results obtained under the above conditions are shown in FIG. 7. As is evident from the Figure, initially $SO_2$ is adsorbed by the catalyst. About 5 hours later, the concentration of $SO_2$ on the reaction pipe outlet side becomes equal to that of $SO_2$ on the inlet side. Of course, there was no $H_2S$ or COS detected in the gas on the reaction pipe outlet side. Further, it was found that the $NO_x$ had been reduction-removed 100%. As is seen in the above examples, the present catalyst adsorbs a certain amount of $SO_2$. Although this saturated amount adsorbed varies with the reaction temperature, there was observed no great differences due to the various catalyst compositions described in the present invention.

EXPERIMENT EXAMPLE 9

Figure 8:
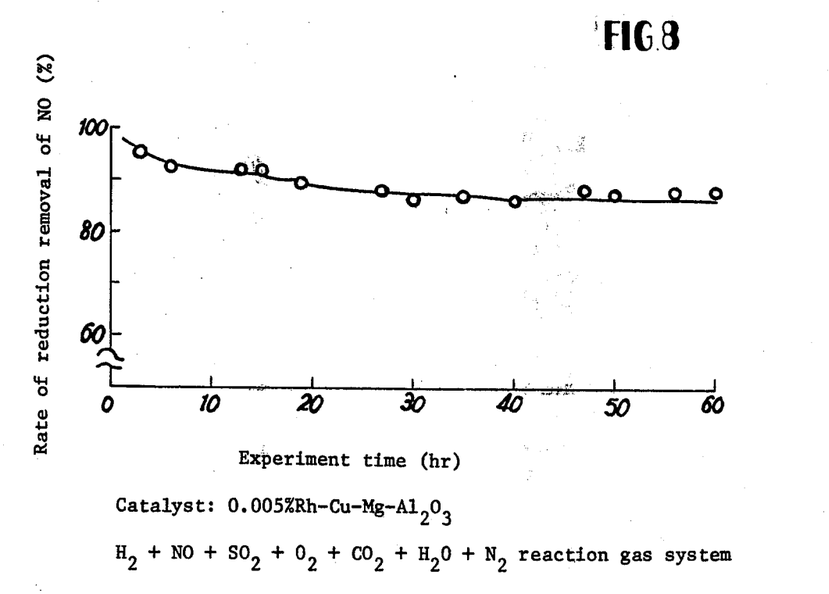
FIG. 8 is a graph illustrating the results of our Experiment Example 9.

In this experiment, an example will be described in which the amount of a precious metal to be added is excessively decreased. The catalyst used was 0.005% Rh—Cu—Mg—$Al_2O_3$, and the reducing agent used was $H_2$. The conditions for experiment are as follows, and the results are shown in FIG. 8.

Reaction gas composition;
700ppm NO + 700ppm $SO_2$ + 1.2% $H_2$ + 0.4% $O_2$ + 11% $CO_2$ + 10% $H_2O$ + $N_2$
Reaction temperature; 450° C
Space velocity (converted for 20° C); $10^4 hr^-$ As seen in FIG. 8, the rate of reduction removal of NO becomes constant since 40 hours after the start. There is observed some difference as compared with the fact that in a similar experiment using a 0.051% Rh—Cu—Mg—$Al_2O_3$ catalyst the rate of reduction removal of NO was maintained at a value of 100%. During that time, of course, neither $H_2S$ nor $NH_3$ was detected in the gas on the reaction pipe outlet side.

Detailed results have been described with reference to Experiment Examples and examples in which slight amounts of Rh and Ru are carried on Cu—Mg—$Al_2O_3$ type catalysts have been described. As for other catalyst type, that is, the catalyst type which carries Cu and the alkali metals, alkaline earth metals or transition metals, such as Cu—K—$Al_2O_3$, Cu—Ba—$Al_2O_3$, Cu—Cr—$Al_2O_3$, Cu—Mn—$Al_2O_3$ and Cu—Mo—$Al_2O_3$, there were obtained substantially the same results as in the case of the Cu—Mg—$Al_2O_3$ type, though there was more or less difference in the rate of reduction removal of NO. And, the catalyst obtained by a precious metal while using as the base the catalyst having no precious metal carried thereon, that is, Cu—Me—$Al_2O_3$, which is less liable to be influenced by $SO_2$, tended to a higher rate of reduction removal of $NO_x$.

As for the method of producing catalysts, the catalysts used in the experiment examples described herein were prepared by the so-called immersion process in which γ-alumina is immersed in an aqueous solution of the salt of a metal to carry it thereon. However, the method of producing catalysts is not limited to the immersion process. Indeed, good results were obtained by using a catalyst having Cu and Rh or Ru impregnation-carried on Me—$Al_2O_3$ (Me: one or more metals selected from the group consisting of the alkali metals, alkaline earth metals and transition metals) produced by the so-called co-precipitation process or kneading process. Further, a catalyst prepared by impregnation carrying Rh or Ru on Cu—Me—$Al_2O_3$ produced by the kneading process or co-precipitation process, was also effective. Therefore, the term "carry" as used in the claims is not intended to limit the process to the immersion process.

EXPERIMENT EXAMPLE 10

In this experiment example, the results of an endurance test on the present catalyst produced on an industrial scale will be described.

The catalyst used in this experiment example was prepared in the following manner.

First, an extruded γ-alumina article (⅜ inch in diameter) was immersed in a mixed aqueous solution of copper nitrate and magnesium nitrate, filtered and baked at 540° C. The baked material was sprayed with an aqueous solution of rhodium chloride and again baked at 540° C to provide a catalyst. The composition of the catalyst thus produced was 0.02% Rh—5% Cu—3% Mg—$Al_2O_3$.

The exhaust gas to be treated used in this experiment example was an exhaust gas resulting from burning of city gas. The composition of the exhaust gas was 3~5% $O_2$ + 50~100ppm No + 2~10ppm $SO_2$ + 12~14% $CO_2$ + 10~12% $H_2O$ + the balance $N_2$. In this experimental equipment, the exhaust gas was admitted into a first reaction vessel in order to decrease the $O_2$ concentration. The first reaction vessel was filled with a 5% Cu-3% Mg—$Al_2O_3$ catalyst and $H_2$ was used as a reductant to decrease the $O_2$ concentration to less than 1%. The purpose was to decrease the evolution of heat in the second catalyst reaction vessel, that is, NO reduction removal reaction vessel. And, NO was added at an exhaust gas line preceding the NO reduction removal reaction vessel so as to adjust the NO inlet concentration to 200ppm. As a reductant, $H_2$ was used. The amount thereof added was controlled so that it was about 1~2 times the theoretical amount necessary for the reduction of $O_2$ and NO.

The NO reduction removal reaction vessel was a 50cmH × 10cmφ stainless steel vessel, which was filled with the 0.02% RH—5% Cu—3% Mg—$Al_2O_3$ catalyst (⅜ inch extruded article) described above to a height of 30cm. The rate of treatment of exhaust gas was 5~7Nm³/hr. A chemical luminescent type analyzer (produced by Yanagimoto Seisaku-Sho) was used for analysis of NO.

Figure 9:
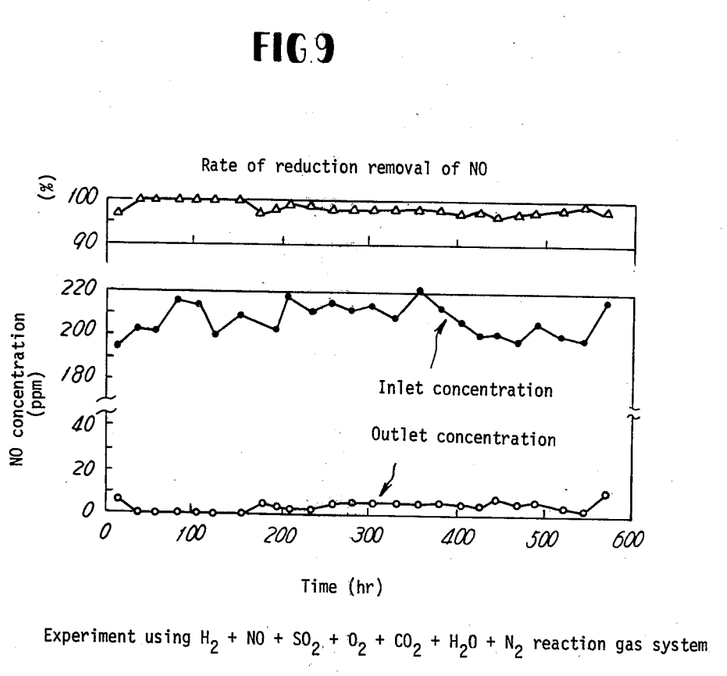
FIG. 9 is a graph illustrating the results of our Experiment Example 10.

The results of this experiment are shown in FIG. 9. The reaction temperature was 450° C. Even in a continuous operation for about 600 hours, the results were very good. During this experiment, formation of $NH_3$ was not recognized, nor was conversion of $SO_2$ into $H_2S$ recognized.

As for the reducing gas, examples have been described in which $H_2$, $CH_4$ and CO were used, and only in the case of $CH_4$ it was necessary to raise the reaction temperature, but there was no substantial difference in the required temperature between CO and $H_2$.

In the experiments, $CH_4$ was selected as a typical example of hydrocarbon, but it is known to use hydrocarbons as reducing agents. For example, according to a report by J. W. Ault, et al. (A. I. Ch. E. Journal Vol. 17, No. 2, page 265~271, 1971), $CH_4$ belongs to a group having the lowest reducing power in the hydrocarbons.

Therefore, when a catalyst according to the present invention is used, it is readily seen that it is possible to replace $CH_4$ by other hydrocarbons while achieving sufficient reduction removal of $NO_x$. Further, the use of said gases, that is, $H_2$, hydrocarbons, CO and other single gases, of course, makes possible the reduction removal of $NO_x$ in an industrially satisfactory manner. However, it can be easily surmised that industrial gases having these gases as the principal ingredients, for example, city gas may be used.

The features of the catalysts of the present invention, that is, Rh—Cu—Me—$Al_2O_3$ and Ru—Cu—Me—$Al_2O_3$ catalysts (Me: one or more metals selected from the group consisting of the alkaline earth metals, alkali metals and transition metals) may be summarized as follows.

(a) They are not poisoned by $O_2$, $H_2O$ and $SO_2$ contained in actual gases, providing a stabilized $NO_x$ reduction removal rate. The activity is very high.

(b) $SO_2$ passes through the present catalysts as it is. And $SO_2$ is never converted into an other substance.

(c) Reduction of $NO_x$ stops upon formation of $N_2$, and there is no $NH_3$ by-produced.

(d) As reducing agents, $H_2$, CO and hydrocarbons such as $CH_4$ gas may be used and industrial gases having these gases as the principal ingredients may also be used.

(e) The production of the catalysts is easy, and in use there is no need for preparatory treatment such as $H_2$ reduction treatment.

As described above, the catalysts invented herein have many features, and it is believed that they are also industrially superior as they can be used for reducing or making harmless the nitrogen oxides contained in exhaust gases discharged from steam-power plants, various furnaces, chemical plants, etc.

We claim:

1. The method of removing nitrogen oxides from a flue gas containing sulphur oxides in excess of 100 ppm, oxygen and water vapor, comprising employing in said flue gas at least one of the reductants hydrogen and carbon monoxide in an amount between 1 and 2 times the theoretical amount required to reduce said nitrogen oxides and to react with said oxygen, and contacting said flue gas and reductant with a catalyst at a temperature in the range of about 300°-450° C, said catalyst consisting essentially of about 5.0% by weight of copper; about 0.005 to 0.05% by weight of rhodium; about 3.0% by weight of one of the metals potassium, barium, magnesium, chromium, manganese and molybdenum; and alumina; said catalyst acting to promote the substantially complete reduction of said nitrogen oxides by and the substantially complete reaction of said oxygen with said reductant, with substantially no conversion of said sulphur oxides into another substance and with substantially no conversion of said nitrogen oxides into ammonia.

2. The method set forth in claim 1 wherein said exhaust gas is reacted with a first catalyst to decrease the concentration of oxygen in said exhaust gas and thereby decrease the amount of reductant required to be employed in the method of claim 1.

3. The method of removing nitrogen oxides from a flue gas containing sulphur oxides in excess of 100 ppm, oxygen and water vapor comprising employing methane in said flue gas as a reductant in an amount between 1 and 2 times the theoretical amount required to reduce said nitrogen oxides and to react with said oxygen, and contacting said flue gas and reductant with a catalyst at a temperature of at least 600° C, said catalyst consisting essentially of about 5.0% by weight of copper; about 0.005 to 0.05% by weight of rhodium; about 3.0% by weight of one of the metals potassium, barium, magnesium, chromium, manganese and molybdenum; and alumina; said catalyst acting to promote the substantially complete reduction of said nitrogen oxides by and the substantially complete reaction of said oxygen with said reductant, with substantially no conversion of said sulphur oxides into another substance and with substantially no conversion of said nitrogen oxides into ammonia.

4. The method set forth in claim 3 wherein said exhaust gas is reacted with a first catalyst to decrease the concentration of oxygen in said exhaust gas and thereby decrease the amount of reductant required to be employed in the method of claim 3.

* * * * *

UNITED STATES PATENT AND TRADEMARK OFFICE
CERTIFICATE OF CORRECTION

PATENT NO. : 4,117,081
DATED : September 26, 1978
INVENTOR(S) : HIDEYA INABA ET AL It is certified that error appears in the above-identified patent and that said Letters Patent are hereby corrected as shown below:

Column 1, line 24, "to" should read -- no --;
Column 2, line 20, "$NO_2$" should read -- $NO_x$ --;
Column 2, line 36, "Masr" should read -- Mast --;

Columns 2 and 3, Table 1-2, for the fourth column from the left, insert the heading -- $H_2O$ --; for the fifth column from the left, change the heading "6°C" to read -- °C --;
Column 3, line 49, "useful in" should read -- used for --;
Column 4, Table 2, line 1, "5.3% Ce" should read -- 5.3% Cu --; in $H_2$ column, line 6, "11 99" should read -- 99 --;
Column 5, Table 3, line 1, "2.5% Ru" should read -- 0.5% Ru --;
Column 9, line 28, "No" should read -- NO --.

Signed and Sealed this

Twenty-fourth Day of April 1979

[SEAL]

Attest:

RUTH C. MASON
Attesting Officer

DONALD W. BANNER
Commissioner of Patents and Trademarks